UNITED STATES PATENT OFFICE.

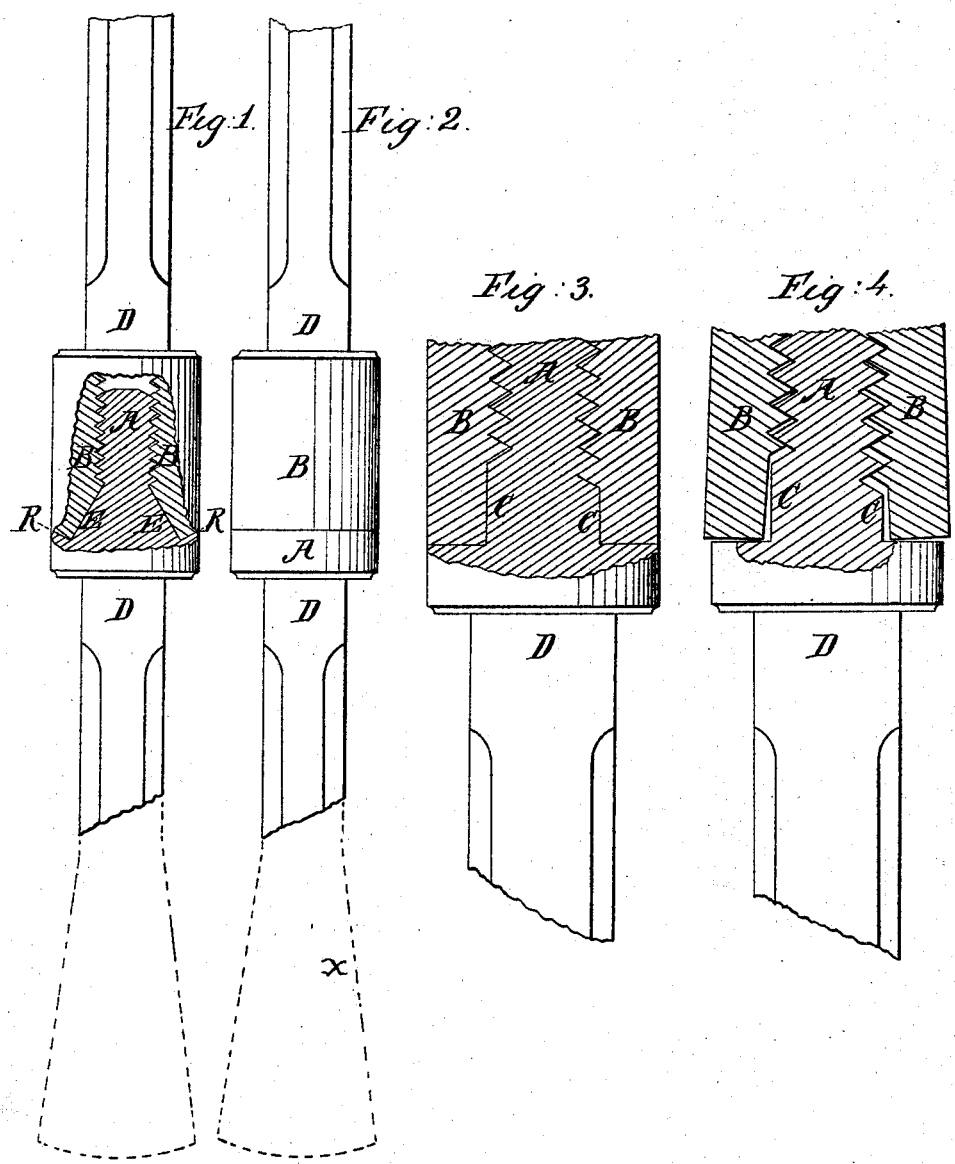

ROBERT H. LECKY, OF ALLEGHENY CITY, PENNSYLVANIA.

COUPLING-SHAFTS OF BORING-TOOLS.

Specification forming part of Letters Patent No. 47,554, dated May 2, 1865.

*To all whom it may concern:*

Be it known that I, ROBERT H. LECKY, of Allegheny City, in the county of Allegheny and State of Pennsylvania, have invented a new and useful Improvement in Socket-Joints for Oil-Tools, &c.; and I do hereby declare that the following is a full and exact description thereof, reference being had to the accompanying drawings, and to the letters of reference marked thereon.

The nature of my invention consists in furnishing the male and female parts of socket-joints of oil-tools, &c., with a series of angles and planes so arranged as to prevent the female or socket part of the joint from spreading and leaving the male or screw part of the joint, and also to hold the parts in steady contact with each other, thereby preventing the parts from wabbling, said angles and planes being constructed and arranged in manner hereinafter described.

To enable others skilled in the art of making oil-tools to make and use my invention, I will proceed to describe its construction and operation.

In the accompanying drawings, Figure 1 represents a section of my improved socket-joint. Fig. 2 represents a side view of the same. Fig. 3 represents the ordinary socket-joint when perfect. Fig. 4 represents the ordinary joint when used for a short time.

In the drawings, A represents the male or screw part of the joint. B represents the socket or female part of the joint. D represents the square shoulder, which is used for holding the parts and for wrenching them up. X represents, in dotted lines, the drill.

It will be observed that the base of the screw A in the male part of my improved joint is made coniformed, as indicated at E, with V-shaped or angular groove around its base, as indicated at R. (See Fig. 1.) The female part B is turned out so as to fit to the screw, also to fit into the angular groove and around the coniformed base of the screw A.

Now, by reference to the base C of the ordinary joint (represented in Figs. 3 and 4) and by reference to my improved joint (represented in Fig. 1) the difference will be readily seen.

It is a fact well known to all skillful mechanics that the threads of the male screw press on their under side down on the upper side of the threads of the female screw; hence it is that when the threads of screws are made angular, as represented in the accompanying drawings, the tendency of the socket or female part of the screw or joint must of necessity be to spread out and leave the male part of the screw or joint, as represented in Fig. 4. Now, the object of my improvement is to prevent this spreading of the nut or female part from the screw or male part of the joint, and hold them always in contact with each other, thereby preventing all wabbling in the joint.

Now, any skillful mechanic will readily see that by the use of the coniformed base of the screw and the angular groove at its base it will be impossible for the nut or socket to spread or leave the screw or male part of the joint, all of which will be clearly seen by reference to Fig. 1 in the accompanying drawings.

Having thus described the nature, construction, and operation of my improvement in socket-joints for oil-tools, &c., what I claim as of my invention is—

The use of the coniformed base E and angular groove R, either separate or combined, when used in connection with the screw A or male part of the socket-joint for oil-tools, &c., the nut B or female part of the joint being fitted and adapted to the male part, the whole being constructed, arranged, and operating substantially in the manner herein described, and for the purpose set forth.

R. H. LECKY.

Witnesses:
JAMES J. JOHNSTON,
ALEXANDER HAYS.